United States Patent
Jeong et al.

(10) Patent No.: US 10,721,313 B2
(45) Date of Patent: Jul. 21, 2020

(54) METHOD FOR PROCESSING SERVICE REQUEST IN WIRELESS COMMUNICATION SYSTEM AND APPARATUS THEREFOR

(71) Applicant: LG ELECTRONICS INC., Seoul (KR)

(72) Inventors: Seungmyeong Jeong, Seoul (KR); Seongyun Kim, Seoul (KR); Dongjoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 15/766,600

(22) PCT Filed: Jun. 15, 2016

(86) PCT No.: PCT/KR2016/006359
§ 371 (c)(1),
(2) Date: Apr. 6, 2018

(87) PCT Pub. No.: WO2017/073876
PCT Pub. Date: May 4, 2017

(65) Prior Publication Data
US 2018/0295196 A1 Oct. 11, 2018

Related U.S. Application Data

(60) Provisional application No. 62/248,326, filed on Oct. 30, 2015, provisional application No. 62/277,887, filed on Jan. 12, 2016.

(51) Int. Cl.
*H04W 4/70* (2018.01)
*H04L 29/08* (2006.01)
(Continued)

(52) U.S. Cl.
CPC .............. *H04L 67/16* (2013.01); *H04L 69/12* (2013.01); *H04W 4/00* (2013.01); *H04W 4/70* (2018.02);
(Continued)

(58) Field of Classification Search
CPC ........... H04W 4/70; H04W 4/00; H04W 4/80; H04L 67/12; H04L 41/5058; H04L 67/14; H04L 69/08
See application file for complete search history.

(56) References Cited

U.S. PATENT DOCUMENTS

2007/0168496 A1    7/2007   Bansod et al.
2012/0016942 A1    1/2012   Cherian et al.
(Continued)

FOREIGN PATENT DOCUMENTS

CN      1745383 A     3/2006
CN    102164186 A     8/2011
(Continued)

*Primary Examiner* — Jae Y Lee
*Assistant Examiner* — Aixa A Guadalupe Cruz
(74) *Attorney, Agent, or Firm* — Birch, Stewart, Kolasch & Birch, LLP

(57) ABSTRACT

A method for processing a service request in a wireless communication system, according to one embodiment of the present invention, is performed by a reception device and comprises the steps of: receiving, from a source device, a retrieve request for a resource corresponding to the service satisfying a filter condition; if a target of the retrieve request is an application resource indicating a specific device, searching for a resource satisfying the filter condition included in the retrieve request; if the resource satisfying the filter condition is not present in the reception device, checking whether the filter condition included in the retrieve request includes at least one new resource creation request indicator corresponding to the service, transmitting a request including the filter condition and an identifier of the source (Continued)

device to the specific device; and receiving a response to the request from the specific device, wherein if the specific device successfully generates at least one new resource satisfying the filter condition, the response may include an address of the at least one new resource which has been generated.

20 Claims, 11 Drawing Sheets

(51) Int. Cl.
*H04W 4/00* (2018.01)
*H04L 29/06* (2006.01)
*H04W 8/18* (2009.01)
*H04W 24/02* (2009.01)
*H04W 8/22* (2009.01)
*H04W 4/02* (2018.01)

(52) U.S. Cl.
CPC ............. *H04W 8/18* (2013.01); *H04W 24/02* (2013.01); *H04W 4/02* (2013.01); *H04W 8/22* (2013.01)

(56) References Cited

U.S. PATENT DOCUMENTS

| | | |
|---|---|---|
| 2015/0223046 A1 | 8/2015 | Patil et al. |
| 2016/0360340 A1* | 12/2016 | Bhalla ..................... H04L 67/16 |
| 2018/0270314 A1* | 9/2018 | Mladin ................... H04L 67/16 |

FOREIGN PATENT DOCUMENTS

| | | |
|---|---|---|
| CN | 104838618 A | 8/2015 |
| KR | 10-2012-0125185 A | 11/2012 |
| WO | WO 2014/185754 A1 | 11/2014 |
| WO | WO 2015/034337 A1 | 3/2015 |

* cited by examiner

METHOD FOR PROCESSING SERVICE REQUEST IN WIRELESS COMMUNICATION SYSTEM AND APPARATUS THEREFOR

CROSS REFERENCE TO RELATED APPLICATIONS

This application is the National Phase of PCT International Application No. PCT/KR2016/006359, filed on Jun. 15, 2016, which claims priority under 35 U.S.C. 119(e) to U.S. Provisional Application No. 62/248,326, filed on Oct. 30, 2015 and No. 62/277,887, fled on Jan. 12, 2016, all of which are hereby expressly incorporated by reference into the present application.

TECHNICAL FIELD

The present invention relates to a method for processing a service request in a wireless system and apparatus therefor.

BACKGROUND ART

If an application 1 (or a device 1) of a specific system uses a service provided by an application 2 (or a device 2) or a service of a different system using the application 2 (or the device 2) in an IOT (internet of tings) communication environment, since a service in a related art system is not exposed, the service may not be usable. In this case, the demand for a request for creating a desired service information within a system and a processing method therefor is rising.

DISCLOSURE OF THE INVENTION

Technical Task

The present invention intends to propose a method of making a request for a service and a method for processing the corresponding request.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of processing a service request in a wireless communication system, the method performed by a receiving device, the method including receiving a retrieve request for a resource corresponding to the service which matches with filter criteria from a source device, when a target of the retrieve request is an application resource representing a specific device, searching for a resource matching with the filter criteria included in the retrieve request, when there is no resource matching with the filter criteria in the receiving device, checking whether includes an indication for requesting a creation of at least one new resource corresponding to the service, when the filter criteria includes the indication, transmitting a request including the filter criteria and an identifier of the source device to the specific device, and receiving a response to the request from the specific device, wherein when the specific device has successfully created the at least one new resource matching with the filter criteria, the response may includes an address of the created at least one new resource.

Additionally or alternatively, the method may further include, when the response includes the address of the created at least one new resource, transmitting a retrieve response including the address of the at least one new resource to the source device.

Additionally or alternatively, the at least one new resource may be created as subordinate to the application resource representing the specific device.

Additionally or alternatively, pointOfAccess attribute of the application resource indicating the specific device may be used to transmit the specific device the request including the filter criteria and the identifier of the source device.

Additionally or alternatively, when the specific device rejects the request, the response may include information indicating that it is rejected by the specific device.

Additionally or alternatively, the request may be rejected based on the identifier of the source device.

Additionally or alternatively, the method may further include, when a resource matching with the filter criteria exists in the receiving device, transmitting a list of the resource matching with the filter criteria to the source device.

Additionally or alternatively, when the specific device fails to successfully create the at least one new resource matching with the filter criteria, the response includes information indicating that the specific device fails to successfully create the at least one new resource.

Additionally or alternatively, the method may further include, when the response includes information indicating that the specific device fails to successfully create the at least one new resource matching with the filter criteria, transmitting a retrieve response including the information to the source device.

In another technical aspect of the present invention, provided herein is a receiving device configured to process a request for a service in a wireless communication system, the receiving device including a transmitter, a receiver, and a processor configured to control the transmitter and the receiver, wherein the processor is further configured to receive a retrieve request for a resource corresponding to the service which matches with filter criteria from a source device, when a target of the retrieve request is an application resource representing a specific device, search for a resource matching with the filter criteria included in the retrieve request, when there is no resource matching with the filter criteria in the receiving device, check whether includes an indication for requesting a creation of at least one new resource corresponding to the service, when the filter criteria includes the indication, transmit a request including the filter criteria and an identifier of the source device to the specific device, wherein the processor is further configured to receive a response to the request from the specific device, and wherein when the specific device has successfully created the at least one new resource matching with the filter criteria, the response may include an address of the created at least one new resource.

Additionally or alternatively, when the response includes the address of the created at least one new resource, wherein the processor may be configured to transmit a retrieve response including the address of the at least one new resource to the source device.

Additionally or alternatively, the at least one new resource may be created as subordinate to the application resource representing the specific device.

Additionally or alternatively, pointOfAccess attribute of the application resource indicating the specific device may be used to transmit the specific device the request including the filter criteria and the identifier of the source device.

Additionally or alternatively, when the specific device rejects the request, the response may include information indicating that it is rejected by the specific device.

Additionally or alternatively, the request may be rejected based on the identifier of the source device.

Additionally or alternatively, when a resource matching with the filter criteria exists in the receiving device, the processor may be configured to transmit a list of the resource matching with the filter criteria to the source device.

Additionally or alternatively, when the specific device fails to successfully create the at least one new resource matching with the filter criteria, the response may include information indicating that the specific device fails to successfully create the at least one new resource.

Additionally or alternatively, when the response includes information indicating that the specific device fails to successfully create the at least one new resource matching with the filter criteria, the processor may be configured to transmit a retrieve response including the information to the source device.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to one embodiment of the present invention, it is able to process a request for retrieving a service (or a resource corresponding to the resource) failing to exist on a platform or CSE, create the corresponding resource in the platform or CSE in response to the corresponding retrieve request additionally, and provide a retrieve requester with a response to it.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
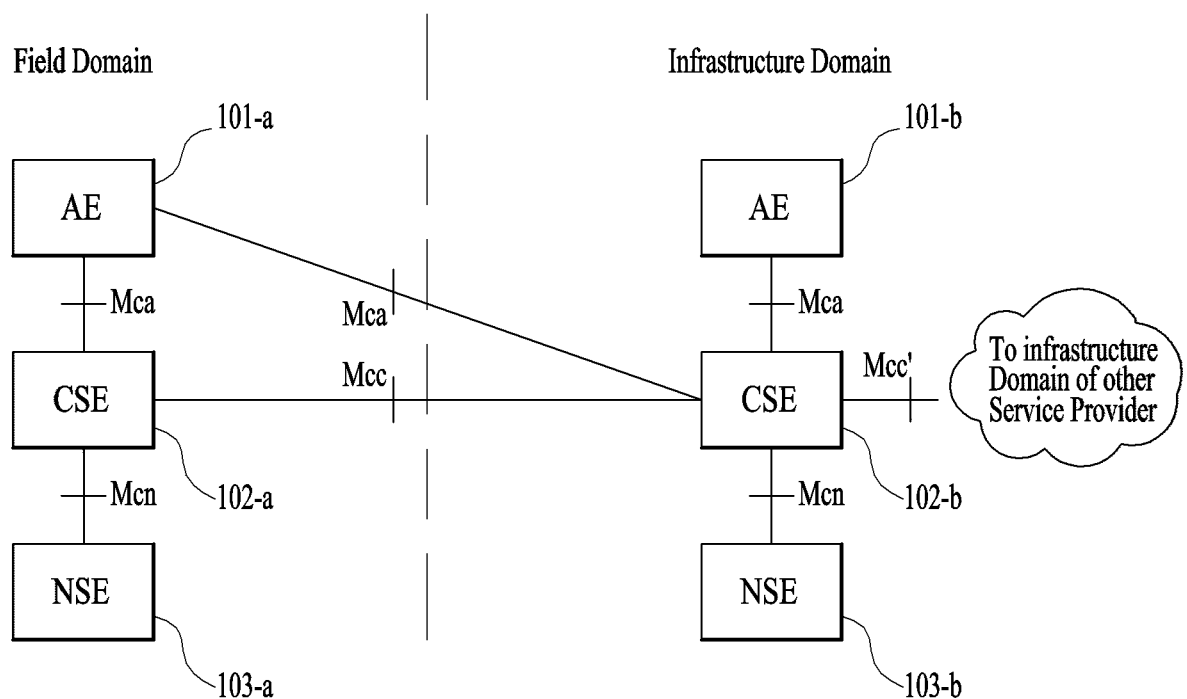
FIG. 1 shows a function structure in an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
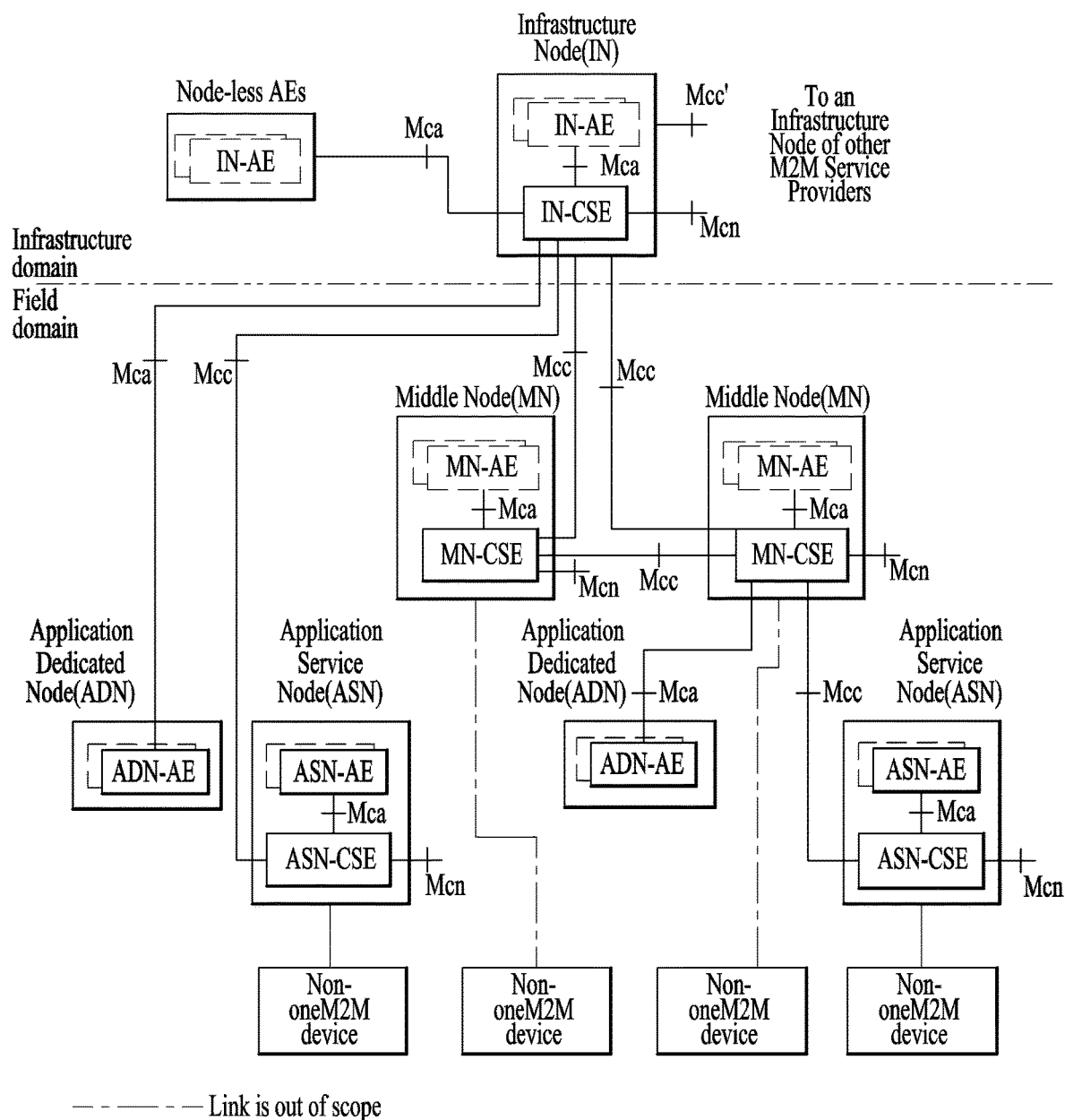
FIG. 2 shows a configuration supported by an M2M communication system based on an M2M function structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;
one or more middle nodes (MNs); and
one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or
one or more application service nodes.

The IN may communicate with one or more ADNs over one or more Mca reference points.

Figure 3:
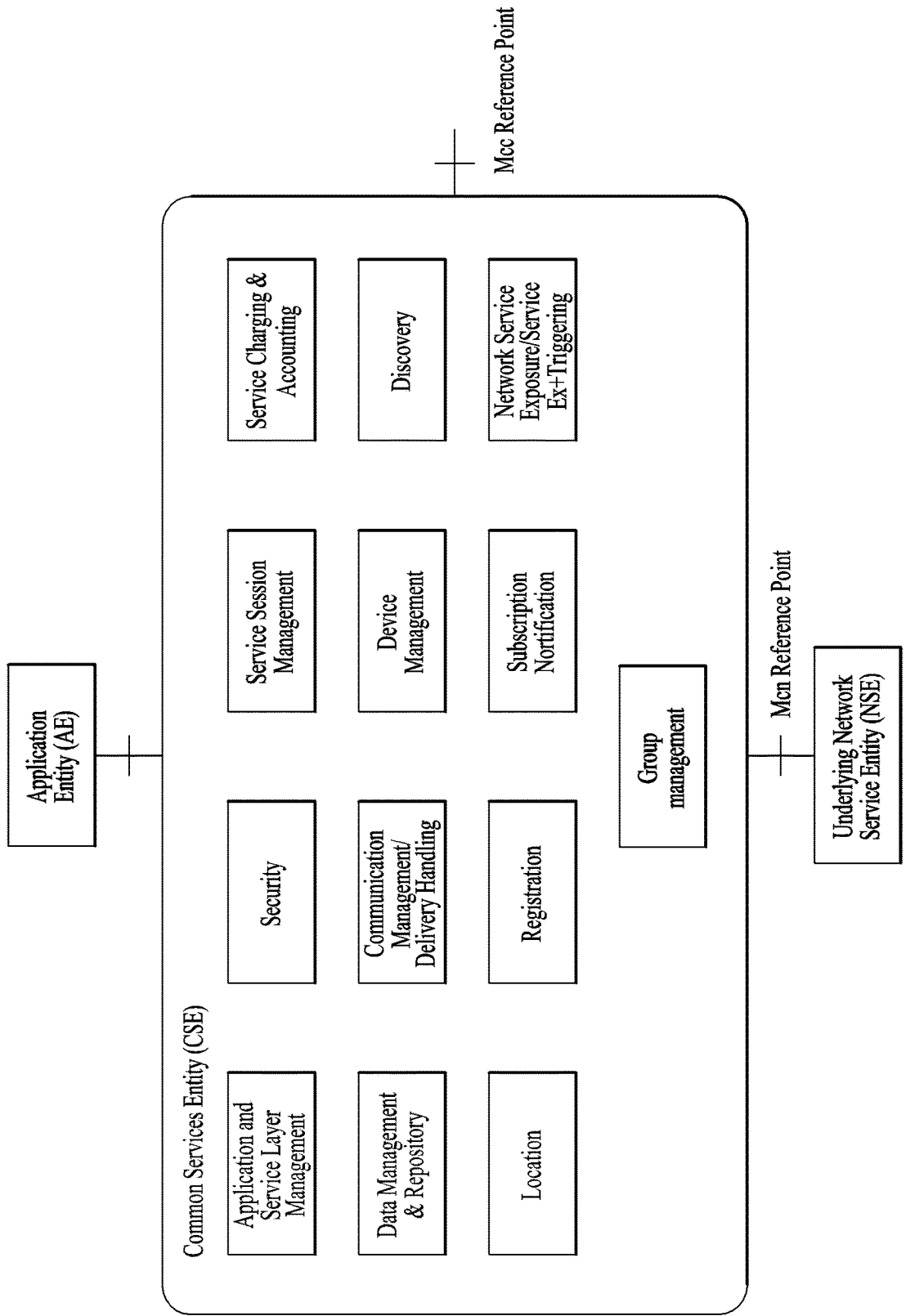
FIG. 3 shows a common service function provided in an M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
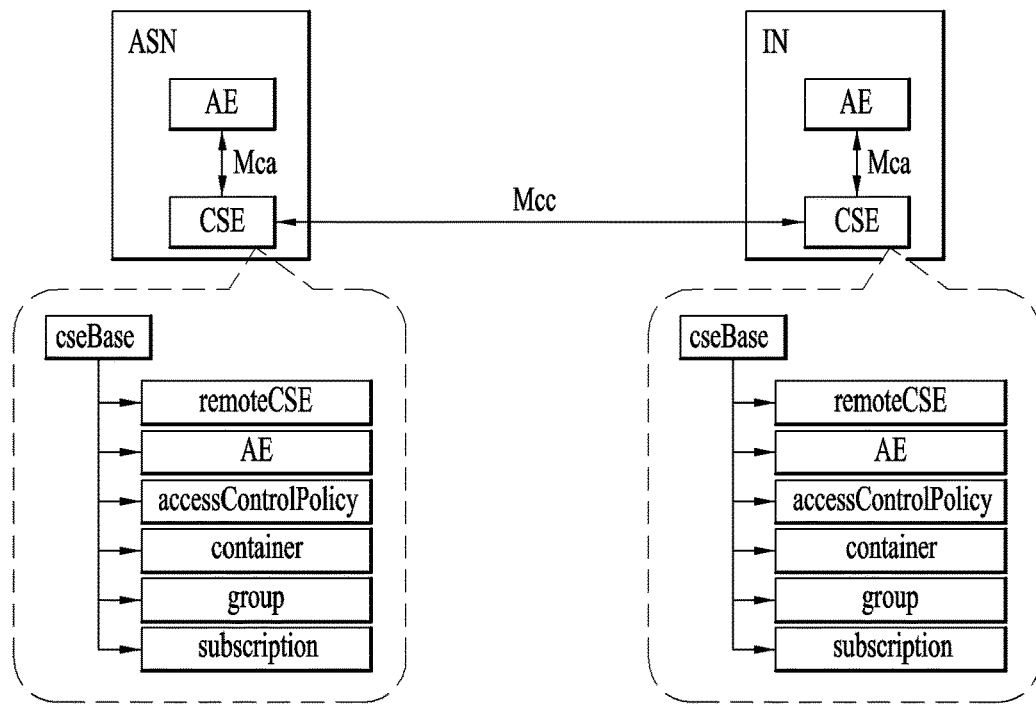
FIG. 4 shows a resource structure existing at an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
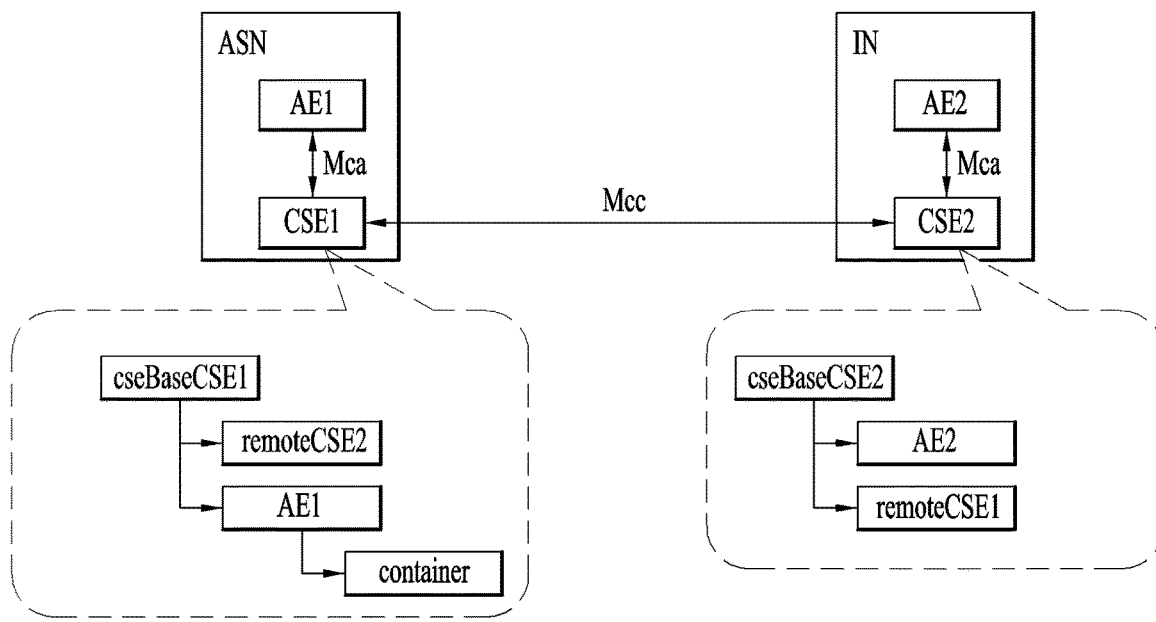
FIG. 5 shows a resource structure existing at an M2M application service node (e.g., an M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
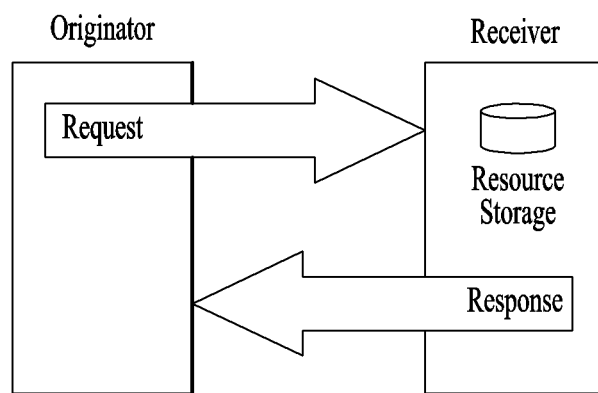
FIG. 6 shows a procedure for exchanging request and response messages used in an M2M communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

Operation: "Operation" means the shape of an operation to be carried out. (This information may be selected from among Create, Retrieve, Update, Delete, and Notify.)

To: "To" means an ID (i.e., ID of the receiver) of an entity scheduled to receive the request.

From: "From" means an ID of a calling user (i.e., call originator) who generates the request.

Request Identifier: "Request Identifier" means an ID (i.e., ID used to discriminate the request message) of the request message Group Request Identifier parameter (identifier to prevent group fan-out request messages from being repeated)

Content: "Content" means content of resources to be transmitted.

The response message may include the following information. If the corresponding request message is successfully processed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message used to identify the ID of the request message.

Result contents: "Result contents" means the processed result (for example, Okay, Okay and Done, Okay and in progress) of the request message.

Content: "Content" means content of resources to be transmitted (only the resultant value (rs) can be transmitted.)

If the request message processing is failed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message (so as to identify the ID of the request message).

rs: "rs" means the processed result (for example, Not Okay) of the request message.

As described above, the response message may include the above-mentioned information.

Meanwhile, various resource types shown in the following table are present.

TABLE 1

| Resource Type | Short Description | Child Resource Types | Parent Resource Types |
| --- | --- | --- | --- |
| AE | Stores information about the AE. It is created as a result of successful registration of an AE with the registrar CSE. | subscription, container, group, accessControlPolicy, mgmtObj, commCapabilities, pollingChannel | remoteCSE, CSEBase |
| cmdhNwAccessRule | Defines a rule for the usage of underlying networks. | schedule subscription | cmdhNetworkAccessRules |
| CSEBase | The structural root for all the resources that are residing on a CSE. It shall store information about the CSE itself. | remoteCSE, node, application, container, group, accessControlPolicy, subscription, mgmtObj, mgmtCmd, locationPolicy, statsConfig | None |
| group | Stores information about resources of the same type that need to be addressed as a Group. Operations addressed to a Group resource shall be | fanOutPoint subscription | Application, remoteCSE, CSEBase |

TABLE 1-continued

| Resource Type | Short Description | Child Resource Types | Parent Resource Types |
|---|---|---|---|
| locationPolicy | executed in a bulk mode for all members belonging to the Group. Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControlPolicy, subscription, mgmtObj, pollingChannel, node schedule | CSEBase |
| subscription | Subscription resource represents the subscription information related to a resource. Such a resource shall be a child resource for the subscribe-to resource. | | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |
| resourceID | 1 | RO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parentID | 1 | RO | The system shall assign the value to this attribute according to the parameters given in the CREATE Request. |

TABLE 2-continued

| Attributes of <container> | Multiplicity | RW/RO/WO | Description |
|---|---|---|---|
| | | | It establishes the parent-child relationship by identification of the parent of this child resource. Such identifier shall use the non-hierarchical URI representation. For example, an AE resource with the identifier "myAE1" which has been created under the resource ". . .//example.com/oneM2M/myCSE", the value of the parentID attribute will contain ". . .//parentID". |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| labels | 0 . . . 1 | WR | Tokens used as keys for discovering resources. This attribute is optional and if not present it means that the resource cannot be found by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |
| creator | 0 . . . 1 | RO | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. The stateTag attribute of the parent |

TABLE 2-continued

| Attributes of <container> | Multiplicity | RW/RO/WO | Description |
|---|---|---|---|
| | | | resource should be incremented first and copied into this stateTag attribute when a new instance is added to the parent resource. |
| announceTo | 0 . . . 1 | RW | This attribute may be included in a CREATE or UPDATE Request in which case it contains a list of URIs/CSE-IDs which the resource being created/updated shall be announced to. This attribute shall only be present on the original resource if it has been successfully announced to other CSEs. This attribute maintains the list of URIs to the successfully announced resources. Updates on this attribute will trigger new resource announcement or de-announcement. |
| announcedAttribute | 0 . . . 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |
| maxNrOfInstances | 0 . . . 1 | RW | Maximum number of instances of <contentInstance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest <contentInstance> resource, when present. |
| locationID | 0 . . . 1 | RW | URI of the resource where the attributes/policies that define how location information are obtained and managed. This attribute is defined only when the <container> resource is used for containing location information. |
| ontologyRef | 0 . . . 1 | RW | A URI of the ontology used to represent the information that is managed and understood by the AE. The ontology refers to a specification in which terms and relationship therebetween used in a domain to be handled. |

The following table defines attributes of <AE> resource.

TABLE 3

| Attributes of <AE> | Multiplicity | RW/RO/WO | Description |
|---|---|---|---|
| resourceType | 1 | RO | Refer to Table 2 |
| parentID | 1 | RO | Refer to Table 2 |
| expirationTime | 1 | RW | Refer to Table 2 |
| accessControlPolicyIDs | 0 . . . 1 (L) | RW | Refer to Table 2 |
| creationTime | 1 | RW | Refer to Table 2 |

TABLE 3-continued

| Attributes of <AE> | Multiplicity | RW/RO/WO | Description |
|---|---|---|---|
| lastModifiedTime | 1 | RO | Refer to Table 2 |
| labels | 0 . . . 1 (L) | RO | Refer to Table 2 |
| announceTo | 0 . . . 1 | RW | Refer to Table 2 |
| announcedAttribute | 0 . . . 1 | RW | Refer to Table 2 |
| appName | 0 . . . 1 | RW | The name of the application, as declared by the application developer(e.g. "HeatingMonitoring") |
| App-ID | 1 | WO | The identifier of the Application |
| AE-ID | 1 | RO | The identifier of the Application Entity |
| pointOfAccess | 0 . . . 1 (L) | RW | The list of addresses for communicating with the registered Application Entity over Mca reference point via the transport services provided by Underlying Network (e.g. IP address, FQDN, URI). This attribute shall be accessible only by the AE and the Hosting CSE. If this information is not provided, the AE should use <pollingChannel> resource. Then the Hosting CSE can forward a request to the AE without using the PoA. |
| ontologyRef | 0 . . . 1 | RW | Refer to Table 2 |
| nodeLink | 0 . . . 1 | RO | A URI of a <node> resource that stores the node specific information. |
| consecutiveRequestSupport | 0 . . . 1 | RW | It is a property that indicates the physical state characteristics of the device. It specifies that the device is able to operate normally in consecutive requests or sets the value to FALSE if the device can malfunction due to external consecutive request(fire). |

Resource Access Control Policy

An access control policy is defined as a "white list" or privileges and each privilege defines "allowed" entities for certain access modes. Sets of privileges are handled such that the resulting privileges for a group of privileges are the sum of the individual privileges; i.e., an action is permitted if the action is permitted by some/any privilege in the set. A selfPrivilege attribute lists entities authorized for Read/Update/Delete of <accessControlPolicy> resource.

All privileges defined by the access control policy are associated with positions, time windows and IP addresses.

Privileges for accessing a resource are defined by privileges defined in <accessControlPolicy> resource by setting an accessControlPolicyID attribute on the resource.

Figure 7:
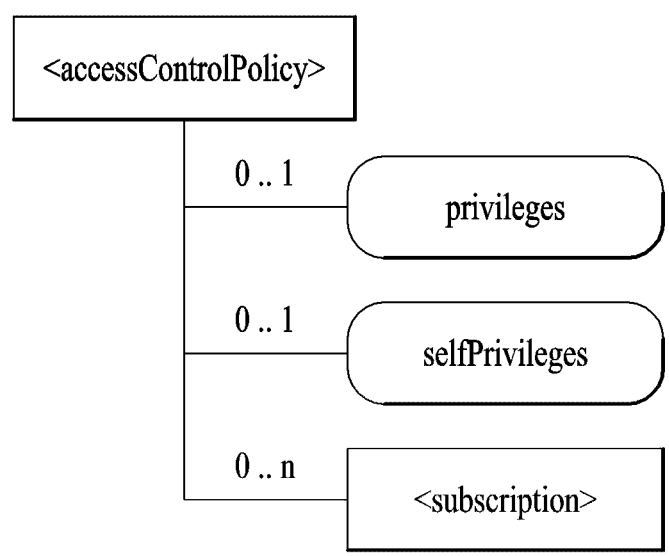
FIG. 7 shows a structure of <accessControlPolicy> resource.

FIG. 7 illustrates a structure of the <accessControlPolicy> resource. The following table shows attributes of the <accessControlPolicy> resource.

TABLE 4

| Attribute Name of <accessControlPolicy> | Multiplicity | RW/RO/WO | Description |
|---|---|---|---|
| resourceType (rT) | 1 | RO | Refer to Table 2 |
| parentID (pID) | 1 | RO | Refer to Table 2 |
| expirationTime (eT) | 1 | RW | Refer to Table 2 |
| labels (lBs) | 0 . . . 1 | RW | Refer to Table 2 |
| creationTime (cT) | 1 | RO | Refer to Table 2 |
| lastModifiedTime (lMT) | 1 | RO | Refer to Table 2 |
| Link | 1 | WO | This attribute shall be present only on the announced resource. This attribute shall provide the link (URI) to the original resource. This is only for <accessControlPolicyAnnc>. |
| announceTo | 1 | RW | Refer to Table 2 |
| announcedAttribute | 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| privileges (ps) | 1 | RW | The list of privileges defined by this <accessControlPolicy> resource. These privileges are applied to resources |

TABLE 4-continued

| Attribute Name of <accessControlPolicy> | Multiplicity | RW/RO/WO | Description |
|---|---|---|---|
| | | | referencing this <accessControlPolicy> resource using the accessControlPolicyID attribute. |
| selfPrivileges (sP) | 1 | RW | Defines the list of privileges for the <accessControlPolicy> resource itself. |

Privileges can be generalized to actions (which may be granting access, but may also be more specific, granting access, i.e. filtering part of data). While the privileges can be generalized to conditions, which may include the identifier of a requestor, except specified identifiers, but the privileges may also include time based conditions.

An access authentication mechanism based on the access control policy operates by matching a requester to the privilege of the requester, stored in the <accessControlPolicy> resource. Upon discovery of positive matching, a requested operation (e.g. RETRIEVE) is checked using a set of allowed operations associated with a matching privilege owner. If the check fails, the request is rejected. Such set is referred to as a privilege flag.

Self-privileges and privileges are lists of requester privileges associated with the <accessControlPolicy> resource itself and privilege flags applied to the <accessControlPolicy> resource and all other resource types which address accessControlPolicyID common attribute.

All privileges defined in the access control policy are associated with positions, time windows and IP addresses prior to access authentication.

Each privilege of the self-privileges and privileges can be configured as a role. Such role is identified by a role name and a URL that addresses an M2M service subscription resource in which the role is defined. When a requester represents itself with a specific role, the access control policy operates by matching the requester with lists, which belong to a specific role specified in the M2M service subscription resource.

Each privilege in the privilege and self-privilege lists includes the following elements.

TABLE 5

| Name | Description |
|---|---|
| originatorPrivileges | Refer to Table 6 |
| Contexts | Refer to Table 7 |
| operationFlags | Refer to Table 8 |

"originatorPrivileges" includes information shown in the following table.

TABLE 6

| Name | Description |
|---|---|
| Domain | FQDN domain |
| Originator identifier | CSE ID or AE ID which represent a originator identity |
| Token | Access token usually provided as query parameter |
| All | All originators |
| Role | A role name associated with the URL the a Service Subscription resource where such role is defined |

"contexts" in Table 5 includes information shown in the following table.

TABLE 7

| Name | Description |
|---|---|
| Context | Defines the context in which every privileges of the present access control policy resource applies, e.g. time windows, location, and IP address. |

"operationFlags" in Table 5 includes information shown in the following table.

TABLE 8

| Name | Description |
|---|---|
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

In an M2M communication system, an access control policy resource is stored separately from a resource to which the corresponding access control policy has been applied. The resource to which the access control policy has been applied has only AccessRightID (URI of the access control policy resource) of the access control policy resource. Accordingly, if an M2M entity wants to check an access control policy of a specific resource, the M2M entity needs to refer to AccessRightID.

Entity Registration

An M2M entity finishes preparation for using systems/services by registering with neighboring entities irrespective of whether the M2M entity is located in the field domain or infrastructure domain. Such registration is performed at the request of a registree and information on the registree is stored in a registrar as a registration result.

After registration, oneM2M entities can use M2M services using common functions provided by a CSE, as illustrated in FIG. 3.

oneM2M entities include an AE and a CSE and thus registration may be divided into AE registration and CSE registration. Here, both the AE and CSE refer to registrees and the CSE corresponds to a registrar. In the case of CSE registration, information on the registrar CSE is additionally stored in the registree CSE.

Figure 8:
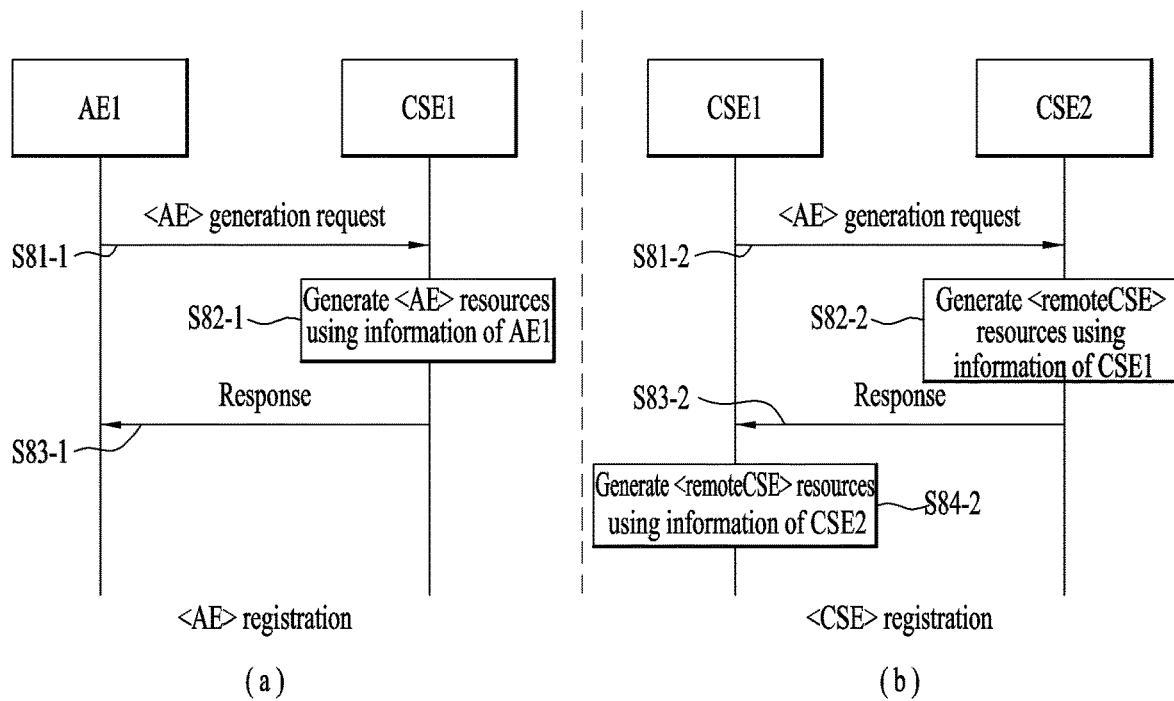
FIG. 8 shows a registration procedure in an M2M communication system.

FIG. 8 illustrates an AE registration procedure and a CSE registration procedure. FIG. 8(a) shows the AE registration procedure. AE1 that intends to perform registration transmits a request for generation of <AE> resources to CSE1 corresponding to a registrar (S81-1). CSE1 can generate the <AE> resources using information of AE1 (S82-2). Then, CSE1 can transmit a response including a result of registration to AE1 (S83-2).

FIG. 8(b) illustrates the CSE registration procedure. The procedure of FIG. 8(b) corresponds to the procedure of FIG. 8(a) except that CSE1 corresponds to a registree, CSE2 corresponds to a registrar, and when CSE2 transmits a result for a registration request of CSE1 (S83-2), CSE1 generates <remoteCSE> resources using information of CSE2 (S84-2).

Subscription Resource Type

The <subscription> resource contains subscription information for its subscribed-to resource. The <subscription> resource is a child of the subscribed-to resource. Hence, the <subscription> resource shall be represented as child resource of the subscribed-to resource. For example, <container> resource has <subscription> resource as a child resource. A <subscription> resource shall be deleted when the parent subscribed-to resource is deleted.

The <subscription> resource shall represent a subscription to a subscribed-to resource. An Originator shall be able to create a resource of <subscription> resource type when the Originator has RETRIEVE privilege to the subscribe-to resource. The Originator which creates a <subscription> resource becomes the resource subscriber.

Each <subscription> resource may include notification policies that specify which, when, and how notifications are sent. These notification policies may work in conjunction with CMDH policies.

When a <subscription> resource is deleted, a Notify request shall be sent to the subscriberURI if it is provided by the Originator.

The <subscription> resource has a child resource, and its name is notificationSchedule that is <schedule> resource type. In the context of the <subscription> resource, the notificationSchedule specifies when notifications may be sent by the Hosting CSE to the notificationURI(s).

The attributes specified to the <subscription> resource are shown as follows. The attributes in the following table lists partial attributes of the <subscription> resource only.

TABLE 8

| Attributes of <subscription> | Multiplicity | RW/RO/WO | Description |
|---|---|---|---|
| accessControlPolicyIDs | 0 . . . 1(L) | RW | See Table 2. If no accessControlPolicyIDs is given at the time of creation, the accesControlPolicies of the parent resource is linked to this attribute. |
| eventNotificationCriteria | 0 . . . 1(L) | RW | This notification policy indicates the event criteria for which a notification is to be generated. |
| expirationCounter | 0 . . . 1 | RW | This notification policy indicates that the subscriber wants to set the life of this subscription to a limit of a maximum number of notifications. When the number of notifications sent reaches the count of this counter, the <subscription> resource shall be deleted, regardless of any other policy. |
| notificationURI | 1(L) | RW | List of URI(s) where the resource subscriber will receive notifications. This list of URI(s) may not represent the resource subscriber entity. For a group-related subscription, the notificationURI shall be the URI that is generated by the group Hosting CSE to receive notifications. In this case, the resource subscriber notification URI shall be included in the notificationForwardingURI. |
| gourpName | 0 . . . 1 | RW | The URI of a <group> resource in case the subscription is made through a group. |
| notificationForwardingURI | 0 . . . 1 | RW | The attribute is a forwarding attribute that shall be present only for group related subscriptions. It represents the resource subscriber notification URI. It shall be used by group Hosting CSE for forwarding aggregated notifications. |
| batchNotify | 0 . . . 1 | RW | This notification policy indicates that the subscriber wants to receive batches of notifications rather than receiving them one at a time. This attribute expresses the subscriber's notification policy and may include two values: the number of notifications to be batched for delivery and a duration. When either value is set, notification events are temporarily stored until either the specified number of notifications have been batched, or, until a duration which starts after the first notification was generated has expired. Following which the batched notifications are sent. If batchNotify is used simultaneously with latestNotify, only the latest notification shall be sent and have the ec set to "latest". |
| rateLimit | 0 . . . 1 | RW | This notification policy indicates that the subscriber wants to limit the rate at which it receives notifications. This attribute expresses the subscriber's notification policy and includes two values: a maximum number of events that may be sent within some duration, and the rateLimit window duration. When the number of |

TABLE 8-continued

| Attributes of <subscription> | Multiplicity | RW/RO/WO | Description |
|---|---|---|---|
| | | | generated notifications within the ratelimit window duration exceeds the maximum number, notification events are temporarily stored, until the end of the window duration, when the sending of notification events restarts in the next window duration. The sending of notification events continues as long as the maximum number of notification events is not exceeded during the window duration. The ratelimit policy may be used simultaneously with other notification policies. |
| preSubscriptionNotify | 0 . . . 1 | WO | This notification policy indicates that the subscriber wants to be sent notifications for events that were generated prior to the creation of this subscription. This attribute has a value of the number of prior notification events requested. If up-to-date caching of retained events is supported on the Hosting CSE and contains the subscribed events then prior notification events will be sent up to the number requested. The preSubscriptionNotify policy may be used simultaneously with any other notification policy.) |
| pendingNotification | 0 . . . 1 | RW | This notification policy, if set, indicates how missed notifications due to a period of connectivity (according to the reachability and notification schedules). The possible values for pendingNotification are:<br>"sendLatest"<br>"sendAllPending"<br>This policy depends upon caching of retained notifications on the hosted CSE. When this attribute is set, only the last notification shall be sent and it shall have the ec set to "latest". If this attribute is not present, the Hosting CSE sends no missed notifications. This policy applies to all notifications regardless of the selected delivery policy (batching, latestNotification, etc..) Note that unreachability due to reasons other than scheduling is not covered by this policy. |
| notificationStoragePriority | 0 . . . 1 | RW | Indicates that the subscriber wants to set a priority for this subscription relative to other subscriptions belonging to this same subscriber. This attribute sets a number within the priority range. When storage of notifications exceeds the allocated size, this policy is used as an input with the storage congestion policy to determine which stored and generated notifications to drop and which ones to retain. |
| latestNotify | 0 . . . 1 | RW | This notification policy indicates if the subscriber wants only the latest notification. If multiple notifications of this subscription are buffered, and if the value of this attribute is set to true, then only the last notification shall be sent and it shall have the ec value set to "latest".) |
| notificationContentType | 1 | RW | Indicates a notification content type that shall be contained in notifications. The allowed values are:.<br>modified attributes only<br>whole resource<br>optionally the reference to this subscription resource.) |
| notificationEventCat | 0 . . . 1 | RW | This notification policy indicates the subscriber's requested ec to be used for notification messages generated by this subscription. |
| creator | 0 . . . 1 | WO | AE-ID or CSE-ID which created the <subscription> resource. |

TABLE 8-continued

| Attributes of <subscription> | Multiplicity | RW/RO/WO | Description |
|---|---|---|---|
| subscriberURI | 0 . . . 1 | WO | URI that is sent a notification when this <subscription> is deleted.) |

The eventNotificationCriteria conditions are shown as follows.

TABLE 9

| Condition tag | Multiplicity | Matching condition |
|---|---|---|
| createBefore | 0 . . . 1 | The creationTime attribute of the resource is chronologically before the specified value. |
| createdAfter | 0 . . . 1 | The creationTime attribute of the resource is chronologically after the specified value. |
| modifiedSince | 0 . . . 1 | The lastModifiedTime attribute of the resource is chronologically after the specified value. |
| unmodifiedSince | 0 . . . 1 | The lastModifiedTime attribute of the resource is chronologically before the specified value. |
| stateTagSmaller | 0 . . . 1 | The stateTag attribute of the resource is smaller than the specified value. |
| stateTagBigger | 0 . . . 1 | The stateTag attribute of the resource is bigger than the specified value. |
| expireBefore | 0 . . . 1 | The expirationTime attribute of the resource is chronologically before the specified value. |
| expireAfter | 0 . . . 1 | The expirationTime attribute of the resource is chronologically after the specified value. |
| sizeAbove | 0 . . . 1 | The contentSize attribute of the <contentInstance> resource is equal to or greater than the specified value. |
| sizeBelow | 0 . . . 1 | The contentSize attribute of the <contentInstance> resource is smaller than the specified value. |
| resourceStatus | 0 . . . n | When the subscribed-to resource is changed by the operations or expiration, the resource status is the same as the specified value. Possible values are: child created, updated, child deleted, deleted. If child created or child deleted is configured, other eventNotificationCriteria conditions shall be applied to the created or deleted child resource. Notification contains the contents for a created child resource or deleted child resource based on value of notificationContentType attribute. If this condition is not specified, the default value is updated. |
| operationMonitor | 0 . . . n | The operations accessing the subscribed-to resource matches with the specified value. It allows monitoring which operation is attempted to the subscribed-to resource regardless of whether the operation is performed. This feature is useful when to find malicious AEs. Possible string arguments are: create, retrieve, update, delete. |
| attribute | 0 . . . n | This is an attribute name of resource types. E.g. creator of container resource type can be used as "creator = Sam". When multiple attributes are set then the result is based upon the AND of all attributes. |

M2M common service layer provides subscription/notification function to application. This enables data to be exchanged between CSE and AE through storages of different CSEs. Subscription/Notification basically operates as shown in FIG. 9.

Entity 2 intends to receive information on a specific event (e.g., resource value change of Entity 1) of Entity. To this end, Entity 2 creates or sets a subscription to the specific event for Entity 1 [S910] and may then receive a response to it [S920]. As the specific event occurs, if a notification according to the subscription is triggered, Entity 1 may notify it to Entity 2 [S930].

Figure 9:
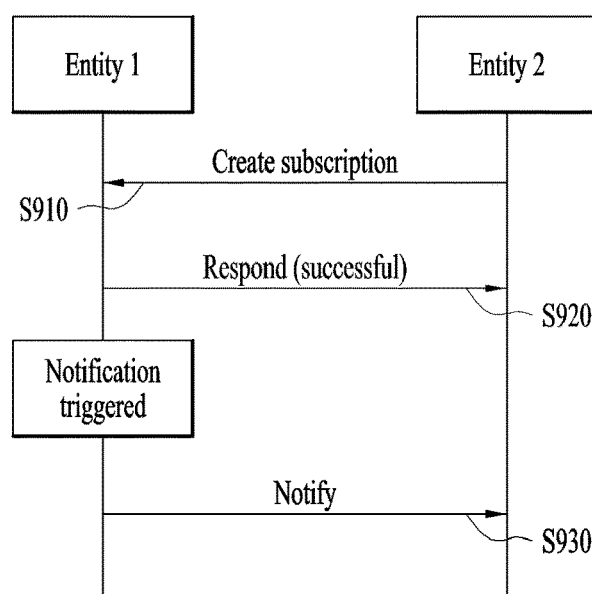
FIG. 9 shows an operation related to a subscription service.
Figure 10:
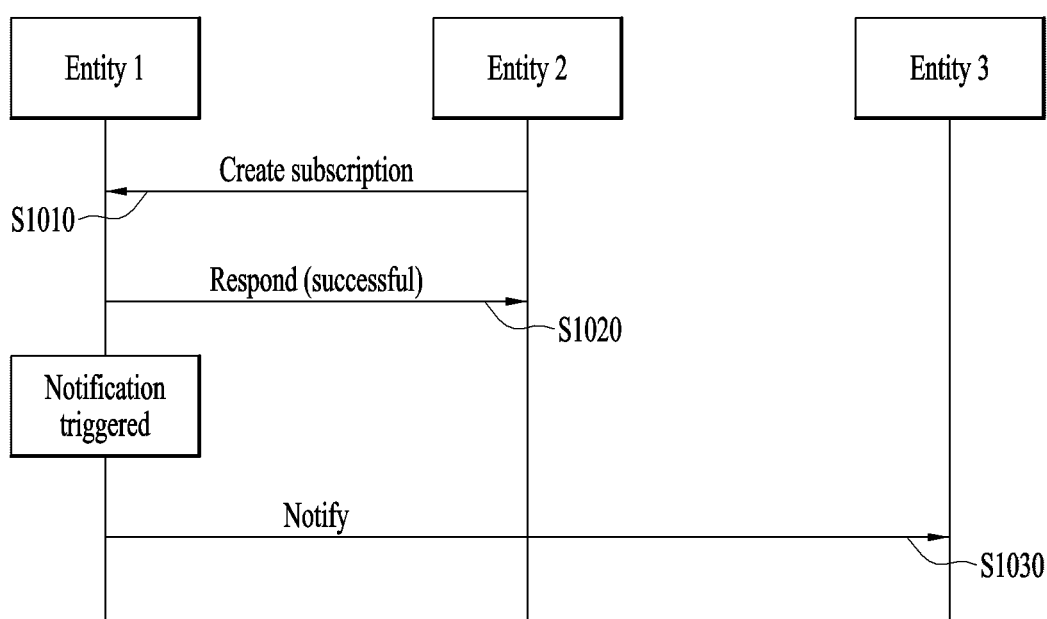
FIG. 10 shows an operation related to a subscription service.

FIG. 10 shows a case that 3 entities are involved in subscription/notification. It is not always necessary for Entity 2 to receive a notification of a subscription created by Entity 2. A case that a single entity creates a subscription for a multitude of other entities in M2M environment may be taken as an example. Hence, in the following environment, an entity having created a subscription may differ from an entity actually receiving a notification. Namely, unlike FIG. 9, although Entity 2 has created or set the subscription [S1010], the notification according to the subscription may be delivered to Entity 3 [S1030].

The subscription set or created in FIG. 9 or FIG. 10 is created or set for Entity 1 in form of the above described subscription resource (<subscription>).

In order that a consumer app using a service uses a service of a producer app providing the service in RESTful system, the producer app should save the service in resource form to a platform. The consumer app discovers (or searches for) the service from RESTful platform and is able to use (e.g., retrieve, update) the service.

Yet, in such a system, a consumer app cannot use service information that is not created by a producer app. Moreover, a procedure for a consumer app and a producer app to perform indirect communication using a resource on a platform as a medium and a procedure for the consumer app to make a request for creating a service desired by the consumer app as a resource to the producer app are not defined.

Each of a consumer app, a producer app, a platform, CSE, AE and the like mentioned in the following may be configured as a single individual device. Hence, they may be used and understood as mutually exchangeable with each separate device.

Figure 11:
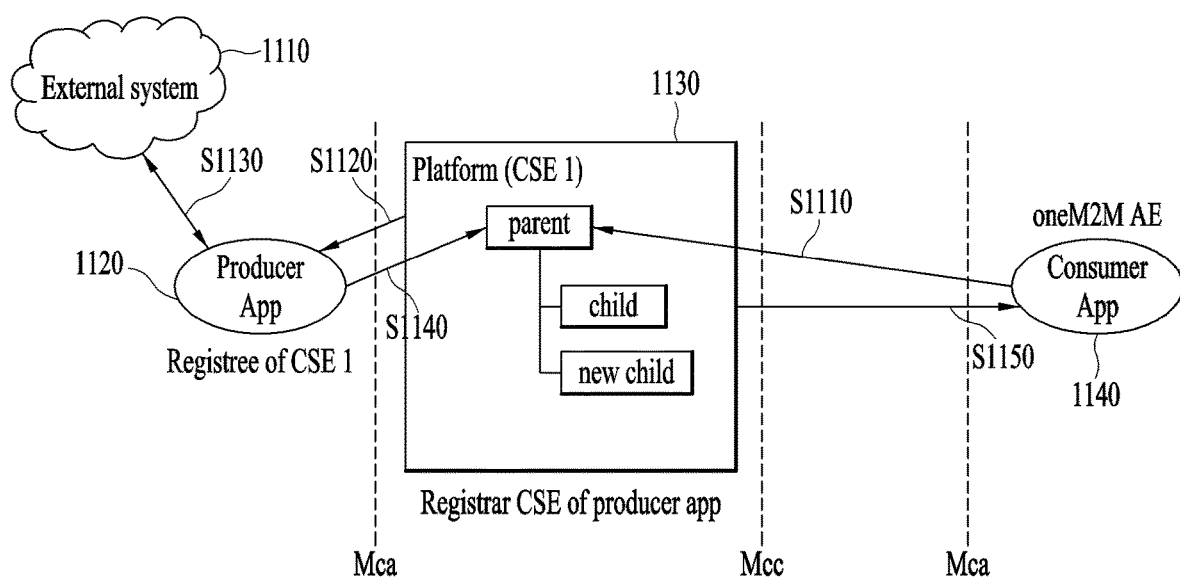
FIG. 11 shows a procedure related to a service request according to one embodiment of the present invention.

In FIG. 11, the present invention assumes an environment as follows. In such an environment, a producer app exposes a service of its own or a service of an external system accessible by the producer app as a resource to a platform (hereinafter referred to as CSE) and a consumer app uses it.

A consumer app 1140 accesses a resource or a sub-resource indicating a producer app 1130 on a platform 1130 and is able to make a request for a new service provision [S1110]. For example, the request may include such an operation as a create request or a retrieve request.

The platform determines whether to have a service indicated by the request. If the platform fails to have the corresponding service, it is able to deliver the request to the producer app 1120 [S1120].

If not having the service indicated by the request, the producer app may obtain information on the corresponding service through external system interworking [S1130].

The producer app may create or expose the service indicated by the request received in the S1120 as a resource to the platform [S1140]. The service may be created or exposed as one of sub-resources (e.g., child resource, great grandchild resource, etc.) of a resource indicating the producer app itself.

In response to the S1110, the platform may deliver information of the newly created resource to the consumer app [S1150].

Service Request Using Retrieve

A related art consumer app may use a discovery or conditional retrieve request as a method of obtaining a resource (service) desired by the consumer app from a platform. In case of using a discovery request, since a consumer app obtains an address (e.g., URI) of a resource matching criteria using a filter criteria parameter, the consumer app should perform an additional retrieve request related procedure in order to obtain service information. In case of using a conditional retrieve request, a consumer app filters a resource of criteria desired by the consumer app using a filter criteria parameter and is then able to obtain information of a corresponding resource using a result content parameter at a time. Yet, both of the methods may obtain the information for a resource (service) existing on an existing platform (e.g., CSE) only.

The present invention proposes the following method. First of all, in case that a consumer app makes a request for a resource (or service) desired by the consumer app to a platform, the corresponding request contains an indicator indicating a request for creating the corresponding resource if the corresponding resource (or service) fails to exist on the platform (i.e., in response to this request, a request for a producer app to create the corresponding resource as a new resource on the platform by delivering an original request to the producer app). For example, it is able to employ a method of delivering the corresponding information to the producer app by newly adding a value for requesting a new service to a filterUsage condition of the filter criteria parameter of the retrieve request.

Thus, after the platform has received the retrieve request containing the specific indicator, when a target resource (e.g., a target indicated by 'To' parameter of the retrieve request) of the corresponding request indicates the producer app (address of a producer app resource stored in the platform, address setting a pre-fix to the address of the producer app resource stored in the platform, etc.), the platform may deliver information (e.g., ID of consumer app, specific indicator, information of a new service (e.g., filter criteria parameter)) contained in the retrieve request to the producer app. Such a delivery may be performed on the producer app after the platform has confirmed that there is no resource to retrieve in the platform. The address of the producer app for the corresponding information delivery to the producer app may use the 'pointOfAccess' attribute existing in <AE> resource having information of the producer app.

Moreover, if the producer app creates (resource) subscription to a resource indicating the producer app or a sub-resource thereof, the platform may deliver the request of the consumer app to the producer app by a different method. In configuring eventNotificationCriteria of the subscription, when the producer app intends to receive external access (access, manipulate) information on a subscribed-to resource like operationMonitor through notification, other parameter informations such as filter criteria and a new service request indicator contained in the request are delivered together as well as an ID of an originator accessing a previously subscribed-to resource and operation type information of a request message. When such configuration is done, the platform having received the retrieve request containing a new service request indicator of the consumer app by indicating the producer app (e.g., indicating the producer app resource stored in the platform or indicating the resource pre-fixing the producer app resource stored in the platform) may be able to deliver notification, which contains ID of the consumer app, retrieve request operation, filter criteria parameter, and indication information for a new service request, to the producer app.

According to an embodiment of the present invention, the producer app receives the information contained in the retrieve request transmitted to the platform by the consumer app and is then able to determine whether to perform a new service retrieve on an external system based on the ID of the consumer app. If the producer app does not performs the retrieve on the external system, the producer app transmits the platform a message indicating that the retrieve is declined and enables the platform to forward it to the consumer app. If the producer app accepts the retrieve, the producer app performs the retrieve on the external system. If there is no corresponding result, the producer app transmits the platform a message indicating 'no corresponding result' and enables the platform to forward the message to the consumer app.

Additionally, the producer app may configure an authority of the consumer app (e.g., discovery authority, retrieve authority) in an access authority (access control policy) to a newly created resource according to a new service request indicator (e.g., on-demand discovery, on-demand retrieve). Hence, the platform may transmit back information of the newly created resource to the consumer app.

After the producer app has received the new service retrieve request from the platform, when the producer app successfully retrieves a new service matching with a condition, the producer app may create it as a sub-resource of a target resource requested to the platform by the consumer app and is able to deliver a list of the created resources to the platform. Thereafter, the platform may deliver address of the corresponding resource(s) or representation of the resource(s) to the consumer app.

Additionally, if the retrieve request of the consumer app contains on-demand discovery indication information, the platform may deliver the corresponding address to the consumer app. Moreover, if the retrieve request of the consumer app contains on-demand retrieve indication information and requests multiple child resource acquisition by a result content parameter, the platform may deliver the representation of the newly created resource to the consumer app.

Figure 12:
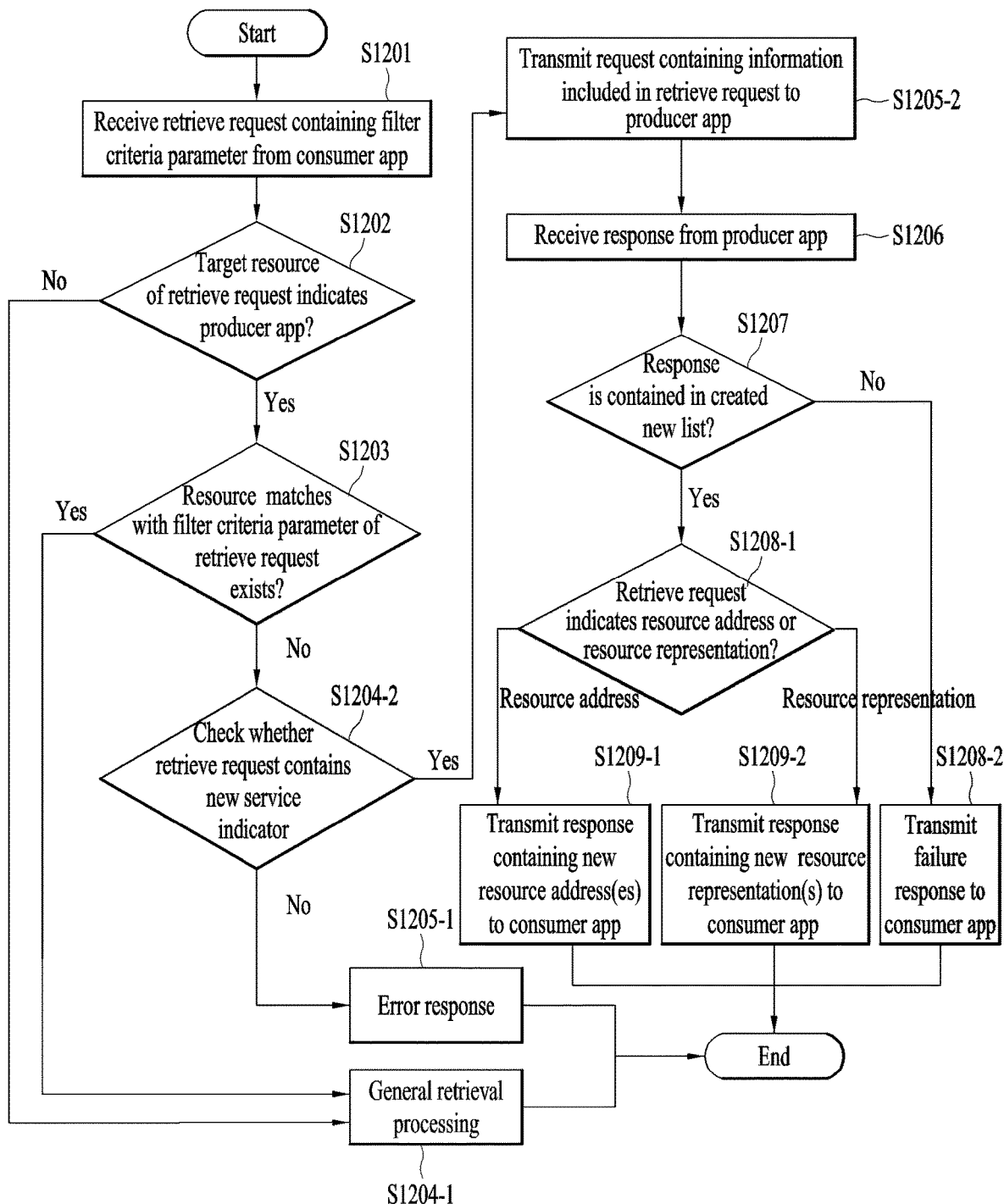
FIG. 12 shows a procedure related to a service request according to one embodiment of the present invention.

FIG. 12 shows a procedure related to a service request according to one embodiment of the present invention.

A platform may receive a retrieve request containing a filter criteria parameter from a consumer app [S1201]. The filter criteria parameter may include an indicator for newly requesting a new service. The new service requesting indicator (hereinafter named a new service indicator) may include a request for the platform to make a request for creating a new resource by requesting a service related information to the producer app although the service related information indicated by the retrieve request does not exist on the platform.

The platform may check whether a target resource of the retrieve request indicates the producer app [S1202]. If the target resource of the retrieve request indicates a producer app resource stored in the platform or a resource pre-fixing the producer app resource, it is able to determine that the target resource of the retrieve request indicates the producer app.

If the retrieve request does not indicate the producer app, the platform may process the retrieve request according to a general request processing procedure [S1204-1].

If the retrieve request indicates the producer app, the platform may check whether there is a resource matching with the filter criteria parameter of the retrieve request [S1203]. If the platform has the resource matching with the filter criteria parameter, the platform may process the retrieve request according to the general request processing procedure [S1204-1].

If the platform does not have the resource matching with the filter criteria parameter, the platform may check whether the retrieve request contains a new service indicator [S1204-2]. If the retrieve request does not contain the new service indicator, the platform may transmit the consumer app a response indicating an error [S1205-1].

If the retrieve request contains the new service indicator, the platform may transmit the producer app a request containing information (e.g., the filter criteria parameter, etc.) contained in the retrieve request [S1205-2].

The producer app may process the request received in the step S1205-2. The producer app performs new service retrieval in response to the received request. If the retrieval is performed successfully, the producer app may create the retrieval result as a sub-resource of the target resource, which is requested by the consumer app, on the platform and is able to transmit a response containing such a result to the platform [S1206]. Here, the response may contain an address of the created resource. Or, if it is determined not to perform the new service retrieval or the retrieval is not performed successfully, a response containing information indicating it may be transmitted to the platform [S1206].

The platform may check whether the response contains a list of a created new service [S1207]. If the response fails to contain the list of the created new service, the platform may transmit the consumer app a response containing information indicating the failure of the retrieve request [S1208-2].

If the response contains the created new service, the platform may check whether the information requested by the consumer app is a resource address or a resource representation [S1208-1]. This is determined depending on on-demand discovery indication information or on-demand retrieve indication information contained in the retrieve request. If the on-demand disc very indication information is contained, a response containing address(es) of the created new resource is transmitted to the consumer app [S1209-1]. If the on-demand retrieve indication information is contained, a response containing representation(s) of the created new resource may be transmitted to the consumer app [S1209-2].

Meanwhile, the step S1208-1 determines whether the indication information contained in the retrieve request is the on-demand discovery indication information or the on-demand retrieve indication information, whereby the step S1209-1 and the step S1209-2 are performed. Yet, the step S1208-1 is an option and may be skipped from the procedure proposed by the present specification. If the step S1208-1 is skipped, the step S1209-1 and the step S1290-2 are combined into a single step so as to be configured as a step of transmitting a response containing a newly created resource address or representation.

Service Request Using Create Request

A consumer app may make a new service request through a create request.

In a related art, by transmitting representation of a resource, which is to be created, to a platform, whereby the corresponding resource may be created. Yet, a new service request message, which uses a create request proposed by the present invention, may contain an indicator for a new service request in a manner that representation of a resource to be created is not contained in a payload (e.g., content parameter). The indicator may be represented in form of a separate parameter or a new condition of the existing filter criteria. Hence, if the create request failing to contain the representation of a resource to be created indicates a producer app (e.g., 'To' parameter of the create request indicates an address of a producer app resource stored in the platform or an address pre-fixing the address of the producer app resource stored in the platform), the platform may deliver a new service request indicator or information on a new service contained in the filter criteria to the producer app.

If the producer app receives the new service request indicator or the information on the new service contained in the filter criteria and then creates a new service matching with the criteria as new resource(s) on the platform, the producer app may transmit the platform a response containing representation of the resource(s) in order to deliver the representation to the consumer app. In doing so, the producer app may additionally deliver an address list of the newly created resource to the platform.

According to a related art, if an originator transmits a create request, a single resource responding to the request is created and a corresponding result may be received in response by the originator. Hence, an initial create request of a consumer app may contain additional indication information so that, to be prepared for a case that a last received response has a plurality of resources, they may be received all. For example, the create request may contain a result content parameter. Although a result content parameter is not used for a create request in the related art, the present invention proposes to use such a parameter. Hence, in order to contain a plurality of address informations, the create request may contain a result content parameter set to 'child-resource' or 'attributes+child-resources'.

Figure 13:
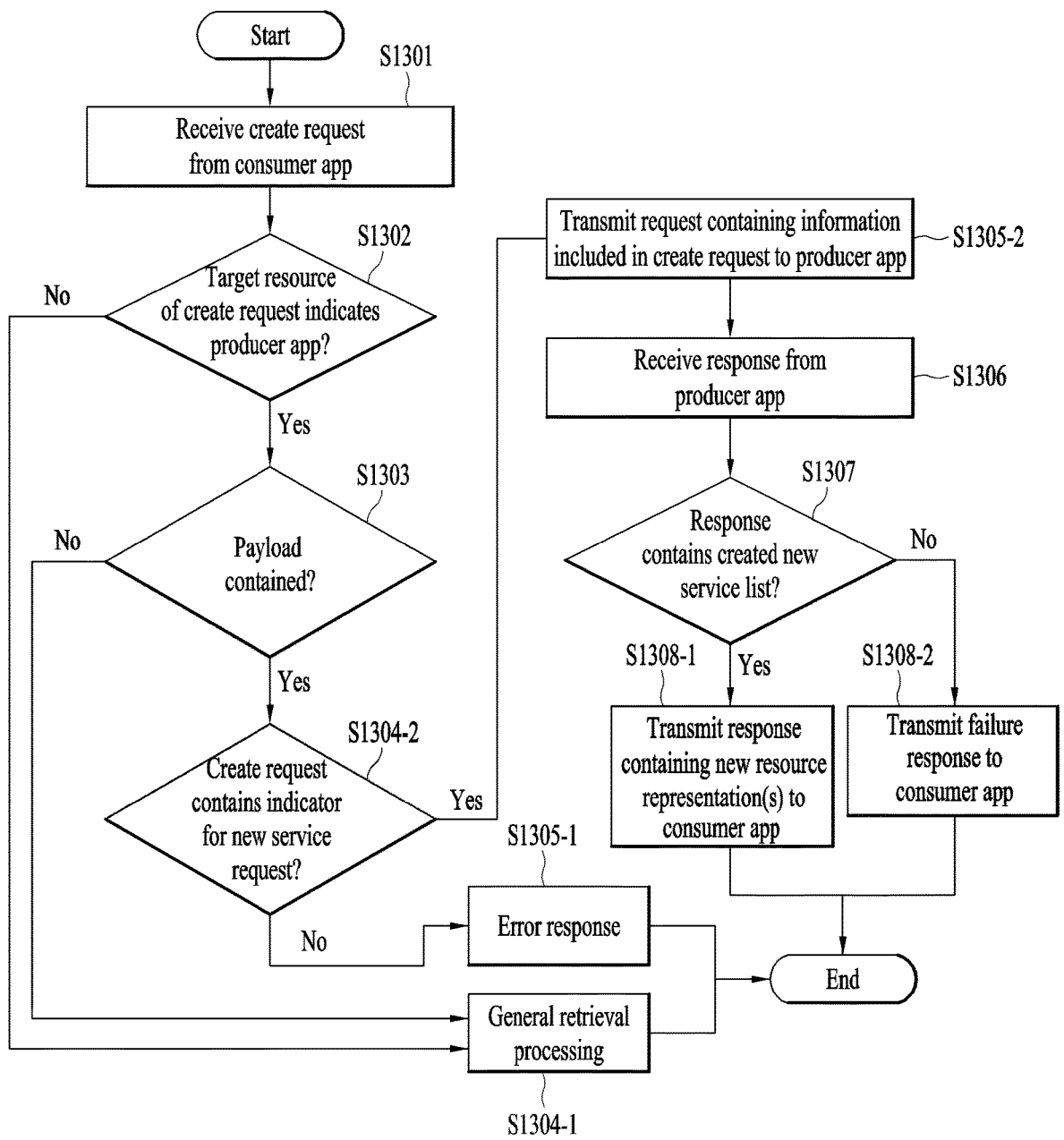
FIG. 13 shows a procedure related to a service request according to one embodiment of the present invention.

FIG. 13 shows a procedure related to a service request according to one embodiment of the present invention.

A platform may receive a crate request from a consumer app [S1301].

The platform may check whether a target resource of the create request indicates a producer app [S1302]. If the target resource of the create request indicates a producer app resource stored in the platform or a resource pre-fixing the producer app resource, it is able to determine that the target resource of the create request indicates the producer app.

If the retrieve request does not indicate the producer app, the platform may process the create request according to a general request processing procedure [S1304-1].

If the retrieve request indicates the producer app, the platform may check whether the create request has a payload [S1303]. If the create request has the payload, the platform may process the create procedure according to a general request processing procedure [S1304-1].

If the create request does not have the payload, the platform may check whether the create request contains an indicator for a new service request [S1304-2]. If the retrieve request does not contain the indicator does not contain the indicator for the new service request, the platform may transmit the consumer app a response indicating an error [S1305-1].

If the retrieve request contains the indicator for the new service request, the platform may transmit the producer app a request containing information (e.g., an indicator or filter criteria for a new service request, filter criteria containing the indicator for the new service request, etc.) contained in the create request [S1305-2].

The producer app may process the request received in the step S1305-2. The producer app performs new service retrieval in response to the received request. If the retrieval is performed successfully, the producer app may create the retrieve result as a sub-resource of a target resource requested by the consumer app and is able to transmit the platform a response containing such a result [S1306]. Or, if it is determined not to perform the new service retrieval or the retrieval is not performed successfully, the consumer app may transmit the platform a response containing information indicating it [S1306].

The platform may check whether the response contains a list of a created new service [S1307]. If the response does not contains the list of the created new service, the platform may transmit the consumer app a response containing information indicating that it fails in the retrieve request [S1308-2].

If the response contains the list of the created new service, the platform may transmit the consumer app a response containing representation(s) of the created new resource [S1308-1].

Figure 14:
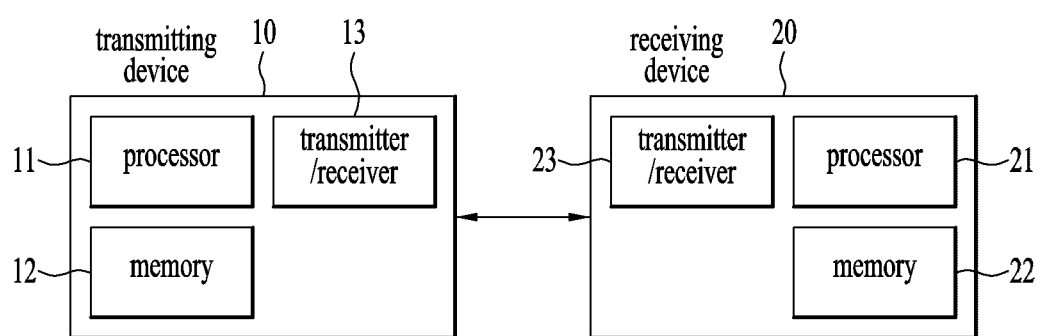
FIG. 14 is a block diagram of a device configured to implement embodiment(s) of the present invention.

FIG. 14 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

INDUSTRIAL APPLICABILITY

The present invention is applicable to wireless communication devices such as a terminal, a relay, and a base station.

What is claimed is:

1. A method of processing a resource discovery in a wireless communication system, the method performed by a hosting common service entity (CSE), comprising:
   receiving, from a first entity, a retrieve request for a resource matching with filter criteria, wherein the retrieve request includes an identifier of the first entity, an address of the hosting CSE and the filter criteria including a filter usage element, and the filter usage element indicates one of 'discovery' or 'on demand discovery';
   searching the resource matching with the filter criteria among resources in the hosting CSE;
   based on both no resource matching with the filter criteria in the hosting CSE and the filter usage element indicating 'on demand discovery', transmitting, to a second entity, a notify request including a target of the retrieve request, the filter criteria and the identifier of the first entity so that the second entity performs an external discovery, wherein the target of the retrieve request is an application resource representing the second entity; and
   receiving, from the second entity, a notify response including at least one new resource being successfully created by the second entity matching with the filter criteria, wherein the notify response further includes an address list of the created at least one new resource.

2. The method of claim 1, further comprising:
   transmitting, to the first entity a retrieve response including the address list of the at least one new resource.

3. The method of claim 1, wherein the at least one new resource is created as descendant resources of the application resource representing the second entity.

4. The method of claim 1, wherein a pointOfAccess attribute of the application resource indicating the second entity is used as an address to transmit, to the second entity, the notify request.

5. The method of claim 1, wherein when the second entity rejects the notify request, the notify response includes information indicating that the notify request is rejected by the second entity.

6. The method of claim 5, wherein the notify request is rejected based on the identifier of the first entity.

7. The method of claim 1, further comprising:
   when at least one resource matching with the filter criteria exists in the hosting CSE, transmitting, to the first entity, an address list of the at least one resource matching with the filter criteria.

8. The method of claim 1, wherein when the second entity fails to create the at least one new resource matching with the filter criteria, the notify response includes information indicating that the second entity fails to create the at least one new resource.

9. The method of claim 1, further comprising:
   when the notify response includes information indicating that the second entity fails to create the at least one new resource matching with the filter criteria, transmitting, to the first entity, a retrieve response including the information.

10. A hosting common service entity (CSE) configured to process a resource discovery in a wireless communication system, the hosting CSE comprising:
    a transmitter;
    a receiver; and
    a processor configured to control the transmitter and the receiver,
    wherein the processor is further configured to:
    receive, from a first entity, a retrieve request for a resource matching with filter criteria, wherein the retrieve request includes an identifier of the first entity, an address of the hosting CSE and the filter criteria including a filter usage element, and the filter usage element indicates one of 'discovery' or 'on demand discovery',
    search the resource matching with the filter criteria among resources in the hosting CSE,
    based on both no resource matching with the filter criteria in the hosting CSE and the filter usage element indicating 'on demand discovery', transmit, to a second entity, a notify request including a target of the retrieve request, the filter criteria and the identifier of the first entity so that the second entity performs an external discovery, wherein the target of the retrieve request is an application resource representing the second entity, and
    receive, from the second entity, a notify response including at least one new resource, being successfully created by the second entity matching with the filter criteria, wherein the notify response further includes an address list of the created at least one new resource.

11. The hosting CSE of claim 10,
    wherein the processor is configured to:
    transmit, to the first entity, a retrieve response including the address list of the at least one new resource.

12. The hosting CSE of claim 10, wherein the at least one new resource is created as descendant resources of the application resource representing the second entity.

13. The hosting CSE of claim 10, wherein a pointOfAccess attribute of the application resource indicating the second entity is used as an address to transmit, to the second entity, the notify request.

14. The hosting CSE of claim 10, wherein when the second entity rejects the notify request, the notify response includes information indicating that the notify request is rejected by the second entity.

15. The hosting CSE of claim 14, wherein the notify request is rejected based on the identifier of the first entity.

16. The hosting CSE of claim 10, wherein when at least one resource matching with the filter criteria exists in the hosting CSE, the processor is further configured to transmit, to the first entity, an address list of the at least one resource matching with the filter criteria.

17. The hosting CSE of claim 10, wherein when the second entity fails to create the at least one new resource matching with the filter criteria, the notify response includes information indicating that the second entity fails to create the at least one new resource.

18. The hosting CSE of claim 10, wherein when the notify response includes information indicating that the second entity fails to create the at least one new resource matching with the filter criteria, the processor is further configured to transmit, to the first entity, a retrieve response including the information.

19. The method of claim 2, further comprising:
- finding at least one address matching with the filter criteria among the address list of the at least one new resource; and
- transmitting, to the first entity, a retrieve response including the at least one address.

20. The hosting CSE of claim 11,
wherein the processor is further configured to:
- find at least one address matching with the filter criteria among the address list of the at least one new resource; and
- transmit, to the first entity, a retrieve response including the at least one address.

* * * * *